United States Patent
Cur et al.

(10) Patent No.: US 8,986,483 B2
(45) Date of Patent: Mar. 24, 2015

(54) METHOD OF MAKING A FOLDED VACUUM INSULATED STRUCTURE

(71) Applicant: Whirlpool Corporation, Benton Harbor, MI (US)

(72) Inventors: Nihat Cur, Saint Joseph, MI (US); Axel Julio Ramm, Saint Joseph, MI (US); Guolian Wu, Saint Joseph, MI (US); James Kendall, Mount Prospect, IL (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 13/837,659

(22) Filed: Mar. 15, 2013

(65) Prior Publication Data

US 2013/0256319 A1  Oct. 3, 2013

Related U.S. Application Data

(60) Provisional application No. 61/618,914, filed on Apr. 2, 2012.

(51) Int. Cl.
| | |
|---|---|
| F25D 23/06 | (2006.01) |
| H04R 3/12 | (2006.01) |
| F25D 23/02 | (2006.01) |
| F25B 39/00 | (2006.01) |
| F25D 11/00 | (2006.01) |
| B29C 53/00 | (2006.01) |

(52) U.S. Cl.
CPC ............... *H04R 3/12* (2013.01); *F25D 23/028* (2013.01); *F25D 23/063* (2013.01); *F25B 39/00* (2013.01); *F25D 11/00* (2013.01); *F25D 23/062* (2013.01); *F25D 23/065* (2013.01); *B29C 53/00* (2013.01); *F25D 2201/14* (2013.01)
USPC .......................................... 156/227; 312/406

(58) Field of Classification Search
None
See application file for complete search history.

(56) References Cited

U.S. PATENT DOCUMENTS

| | | | |
|---|---|---|---|
| 2,108,212 A | 2/1938 | Schellens | |
| 3,137,900 A | 6/1964 | Carbary | |
| 4,043,624 A * | 8/1977 | Lindenschmidt | 312/406 |
| 4,660,271 A | 4/1987 | Lenhardt | |
| 4,671,985 A | 6/1987 | Rodrigues et al. | |
| 4,917,841 A | 4/1990 | Jenkins | |
| 5,007,226 A | 4/1991 | Nelson | |
| 5,033,636 A | 7/1991 | Jenkins | |
| 5,082,335 A | 1/1992 | Cur et al. | |
| 5,221,136 A | 6/1993 | Hauck et al. | |
| 5,248,196 A | 9/1993 | Lynn et al. | |
| 5,252,408 A | 10/1993 | Bridges et al. | |
| 5,263,773 A | 11/1993 | Gable et al. | |
| 5,359,795 A | 11/1994 | Mawby et al. | |
| 5,512,345 A | 4/1996 | Tsutsumi et al. | |
| 5,632,543 A | 5/1997 | McGrath et al. | |

(Continued)

FOREIGN PATENT DOCUMENTS

| | | |
|---|---|---|
| CA | 1320631 | 7/1993 |
| CA | 2259665 | 1/1998 |

(Continued)

*Primary Examiner* — Barbara J Musser

(57) ABSTRACT

A vacuum insulated cabinet structure includes panels having sheet metal outer side walls and polymer inner side walls. The polymer inner side walls are heat-sealed to a layer of polymer material laminated to a flat sheet metal blank to form vacuum cavities. The blank is then bent along fold lines to form a cabinet structure.

11 Claims, 10 Drawing Sheets

(56) References Cited

U.S. PATENT DOCUMENTS

| | | | |
|---|---|---|---|
| 5,652,039 A | 7/1997 | Tremain et al. | |
| 5,985,189 A | 11/1999 | Lynn et al. | |
| 6,109,712 A | 8/2000 | Haworth et al. | |
| 6,128,914 A | 10/2000 | Tamaoki et al. | |
| 6,164,030 A | 12/2000 | Dietrich | |
| 6,224,179 B1 | 5/2001 | Wenning et al. | |
| 6,260,377 B1 | 7/2001 | Tamaoki et al. | |
| 6,408,841 B1 | 6/2002 | Hirath et al. | |
| 6,460,955 B1 * | 10/2002 | Vaughan et al. | 312/401 |
| 7,210,308 B2 | 5/2007 | Tanimoto et al. | |
| 7,296,432 B2 | 11/2007 | Muller et al. | |
| 7,316,125 B2 | 1/2008 | Uekado et al. | |
| 7,641,298 B2 | 1/2010 | Hirath et al. | |
| 7,815,269 B2 | 10/2010 | Wenning et al. | |
| 7,886,559 B2 | 2/2011 | Hell et al. | |
| 7,930,892 B1 | 4/2011 | Vonderhaar | |
| 8,117,865 B2 | 2/2012 | Allard et al. | |
| 8,353,177 B2 | 1/2013 | Adamski et al. | |
| 2006/0076863 A1 * | 4/2006 | Echigoya et al. | 312/401 |
| 2006/0201189 A1 | 9/2006 | Adamski et al. | |
| 2007/0001563 A1 | 1/2007 | Park et al. | |
| 2007/0099502 A1 | 5/2007 | Ferinauer et al. | |
| 2009/0056367 A1 | 3/2009 | Neumann | |
| 2009/0058244 A1 | 3/2009 | Cho et al. | |
| 2009/0113925 A1 | 5/2009 | Korkmaz | |
| 2009/0179541 A1 | 7/2009 | Smith et al. | |
| 2010/0293984 A1 | 11/2010 | Adamski et al. | |
| 2010/0295435 A1 | 11/2010 | Kendall et al. | |
| 2011/0030894 A1 * | 2/2011 | Tenra et al. | 156/286 |
| 2011/0146335 A1 | 6/2011 | Jung et al. | |
| 2011/0260351 A1 | 10/2011 | Corradi et al. | |
| 2011/0290808 A1 | 12/2011 | Bai et al. | |
| 2011/0315693 A1 | 12/2011 | Cur et al. | |
| 2012/0000234 A1 | 1/2012 | Adamski et al. | |
| 2012/0103006 A1 | 5/2012 | Jung et al. | |
| 2012/0104923 A1 | 5/2012 | Jung et al. | |
| 2012/0118002 A1 | 5/2012 | Kim et al. | |
| 2012/0137501 A1 | 6/2012 | Allard et al. | |
| 2012/0279247 A1 | 11/2012 | Katu et al. | |
| 2012/0297813 A1 | 11/2012 | Hanley et al. | |
| 2012/0324937 A1 | 12/2012 | Adamski et al. | |

FOREIGN PATENT DOCUMENTS

| | | |
|---|---|---|
| CN | 1158509 | 7/2004 |
| CN | 1970185 | 5/2007 |
| CN | 100359272 | 1/2008 |
| CN | 102452522 | 5/2012 |
| DE | 102010024951 | 12/2011 |
| EP | 1200785 | 5/2002 |
| EP | 1505359 | 2/2005 |
| GB | 837929 | 6/1960 |
| GB | 1214548 | 12/1970 |
| JP | 73028353 | 8/1973 |
| JP | 51057777 | 5/1976 |
| JP | 08300052 | 11/1996 |
| JP | 2000117334 | 4/2000 |
| JP | 2001343176 | 12/2001 |
| JP | 03478771 | 12/2003 |
| JP | 2004303695 | 10/2004 |
| JP | 2005164193 | 6/2005 |
| JP | 2009162402 | 7/2009 |
| JP | 2010145002 | 7/2010 |
| JP | 04545126 B2 | 9/2010 |
| JP | 2010236770 | 10/2010 |
| JP | 2010276309 | 12/2010 |
| JP | 2011196644 | 10/2011 |
| JP | 2012087993 | 5/2012 |
| JP | 2012242075 | 12/2012 |
| KR | 20040000126 | 1/2004 |
| WO | WO 2010043009 A2 * | 4/2010 |
| WO | WO2010092627 | 8/2010 |
| WO | WO2011003711 | 1/2011 |
| WO | WO2012026715 | 3/2012 |

* cited by examiner

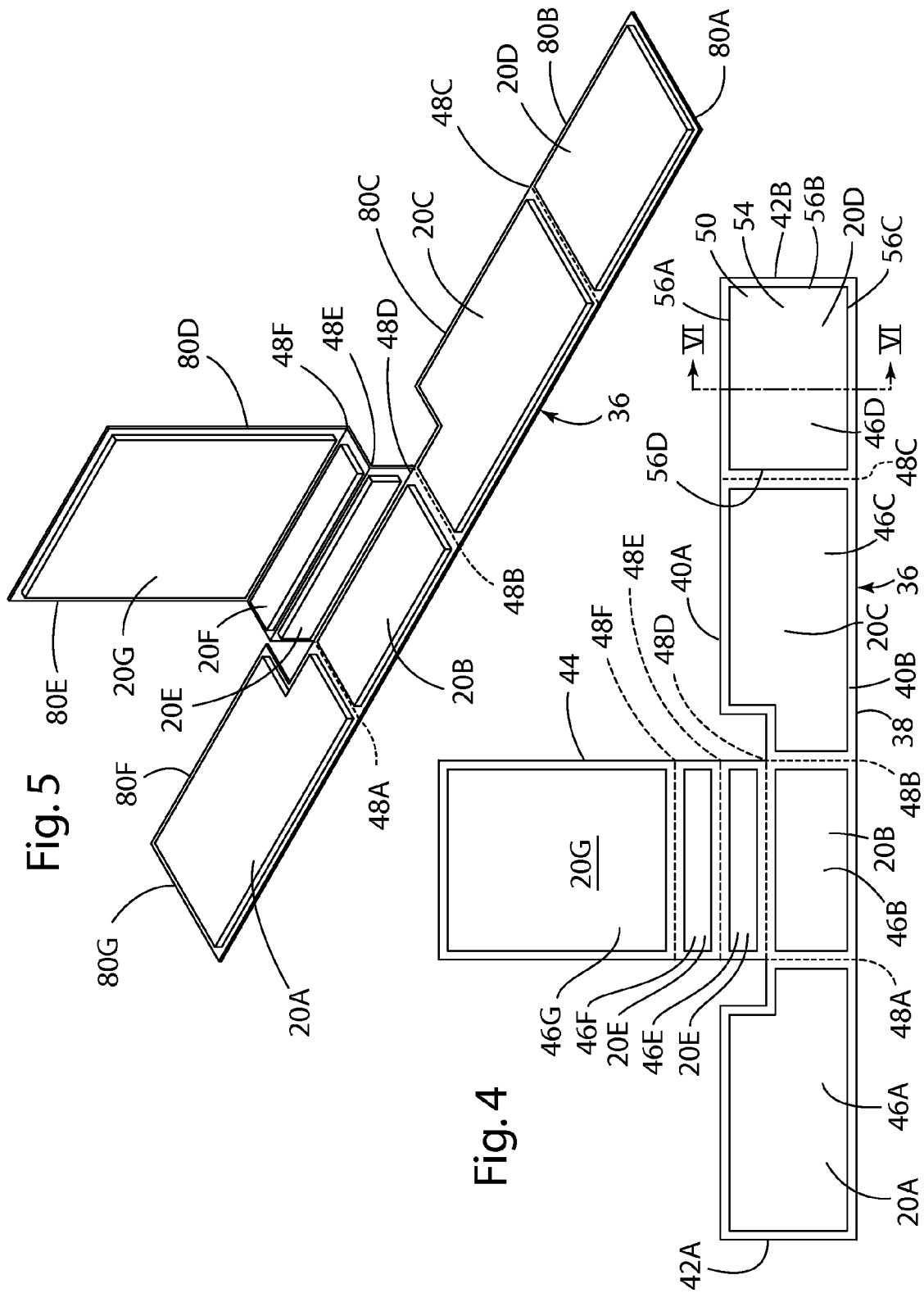

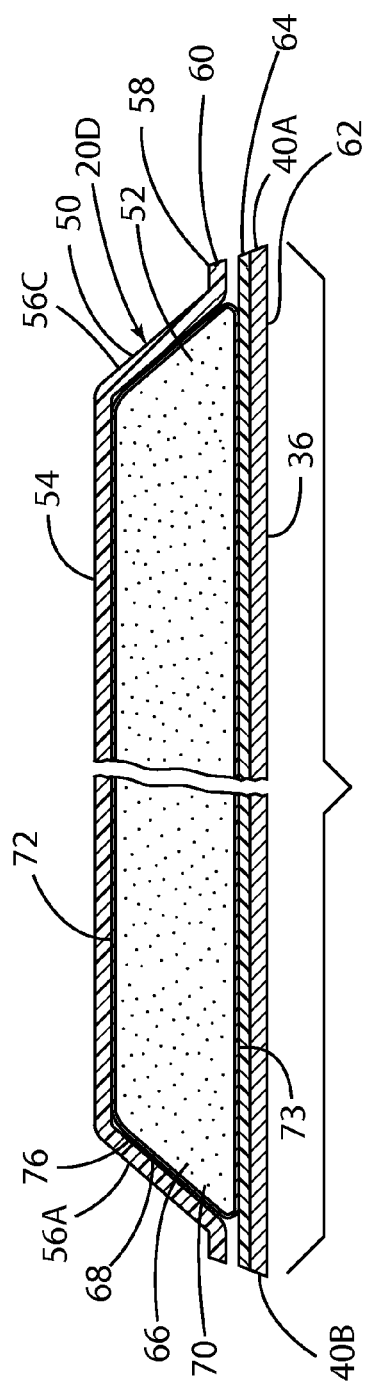
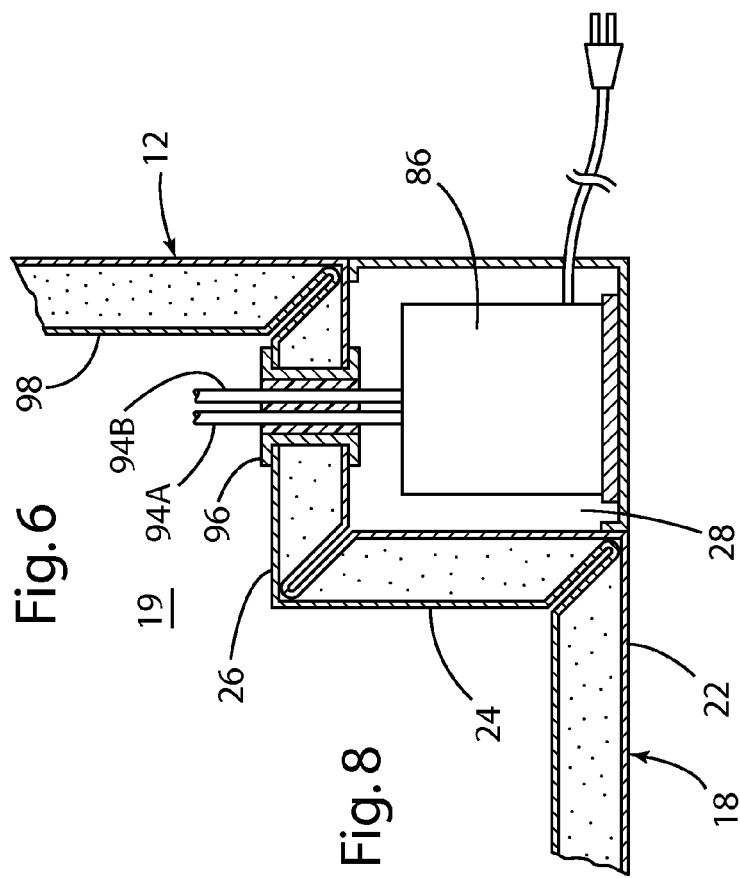

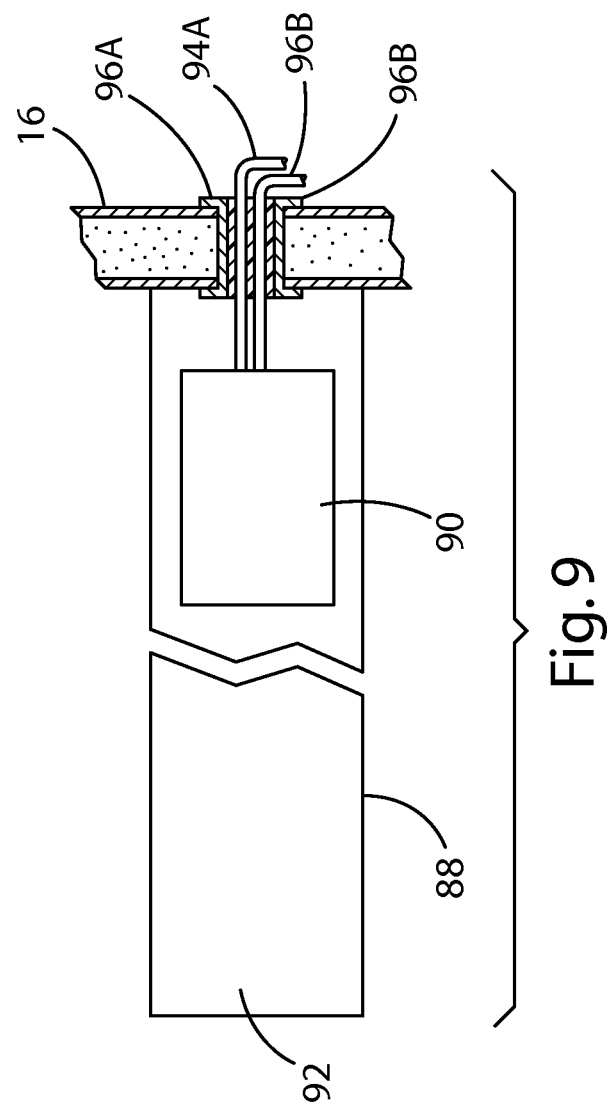

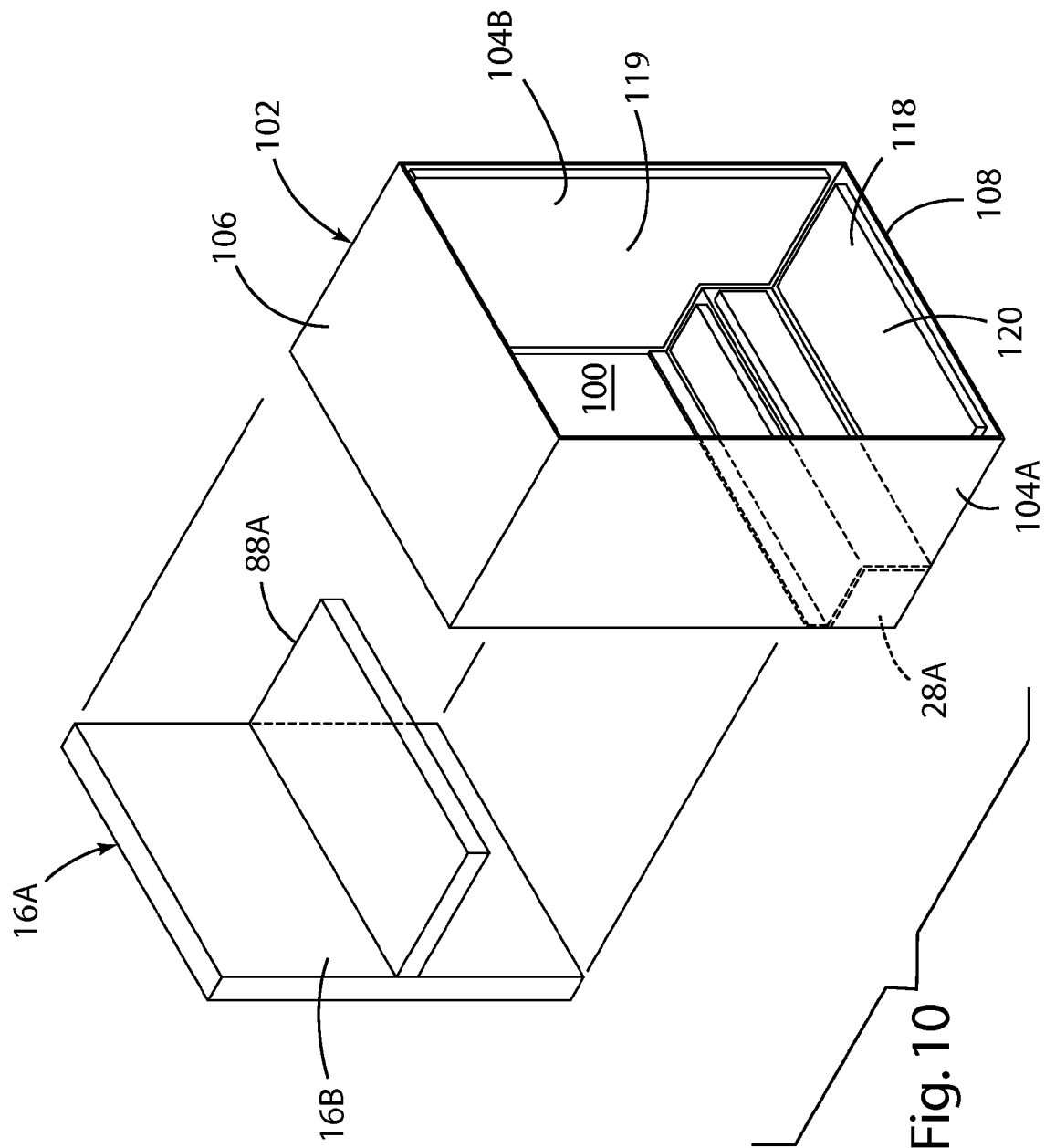

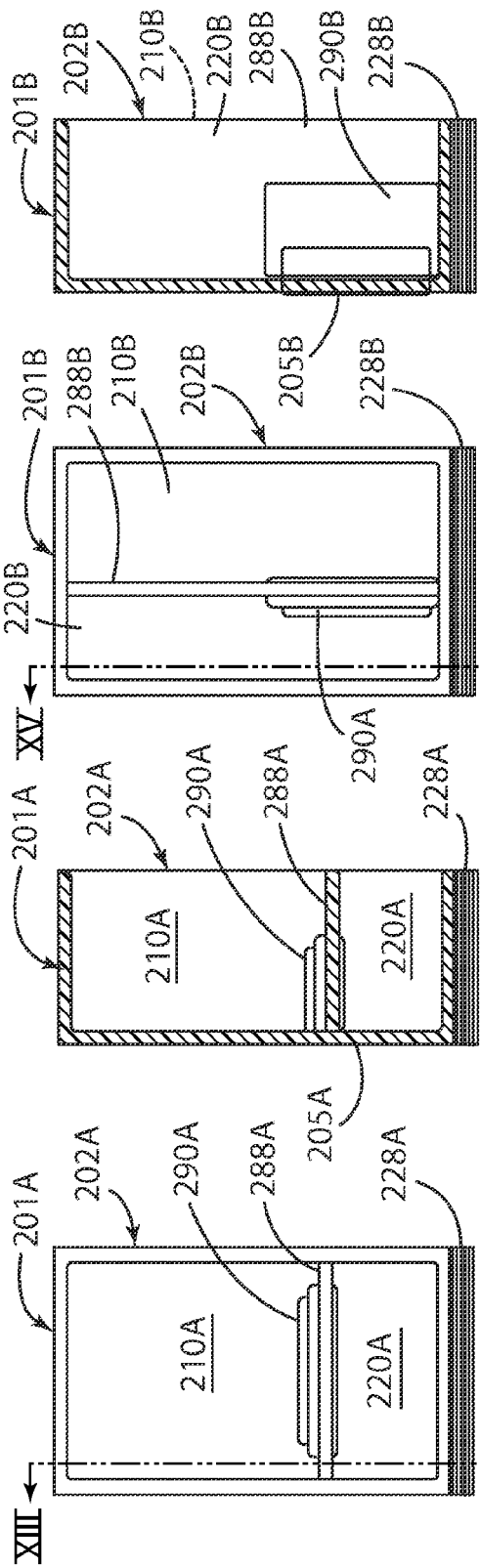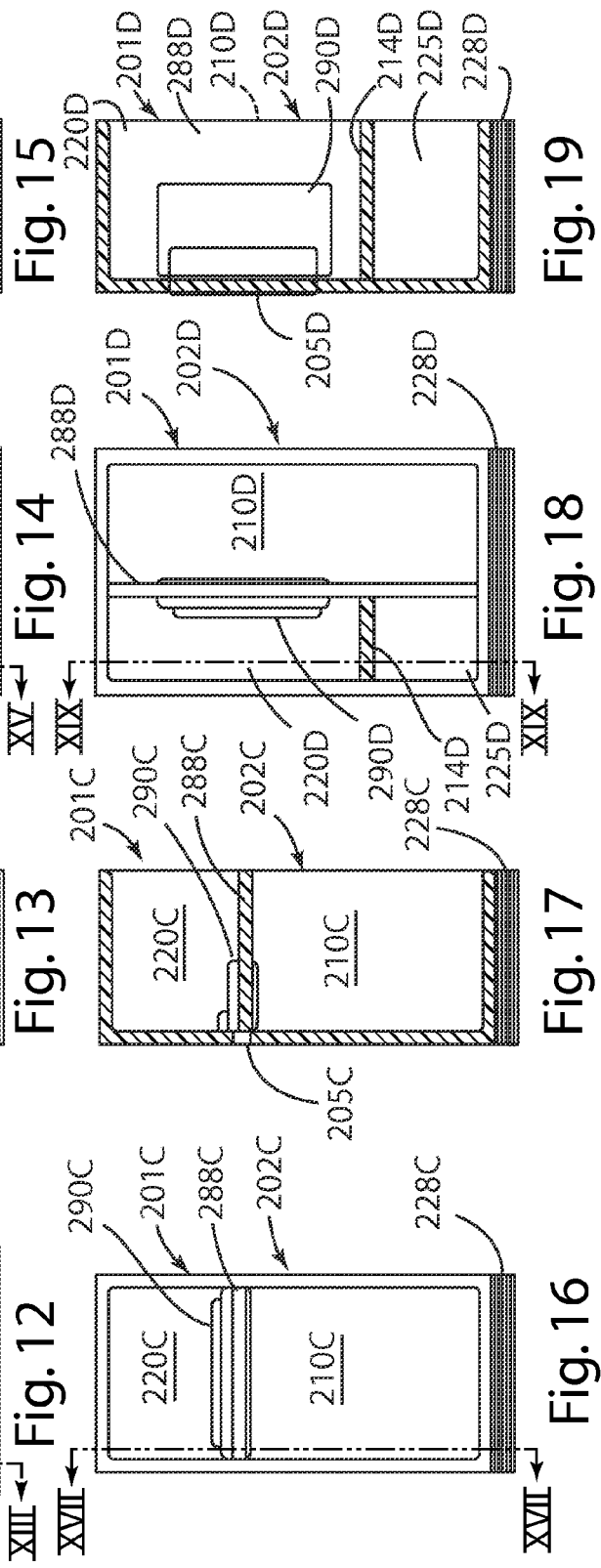

METHOD OF MAKING A FOLDED VACUUM INSULATED STRUCTURE

CROSS-REFERENCE TO RELATED APPLICATIONS

The present application is related to U.S. patent application Ser. No. 13/833,635 filed Mar. 15, 2013, entitled A METHOD TO CREATE VACUUM INSULATED CABINETS FOR REFRIGERATORS; and U.S. patent application Ser. No. 13/836,669 filed Mar. 15, 2013, entitled FOLDED VACUUM INSULATED STRUCTURE; and U.S. patent application Ser. No. 13/835,449 filed Mar. 15, 2013, entitled A VACUUM PANEL CABINET STRUCTURE FOR A REFRIGERATOR; and U.S. patent application Ser. No. 13/832,246 filed Mar. 15, 2013, entitled DUAL COOLING SYSTEMS TO MINIMIZE OFF-CYCLE MIGRATION LOSS IN REFRIGERATORS WITH A VACUUM INSULATED STRUCTURE; and U.S. patent application Ser. No. 13/833,696 filed Mar. 15, 2013, entitled VACUUM INSULATED DOOR STRUCTURE AND METHOD FOR THE CREATION THEREOF; and U.S. patent application Ser. No. 13/836,143 filed Mar. 15, 2013, entitled VACUUM INSULATED STRUCTURE TUBUALAR CABINET CONSTRUCTION; and U.S. patent application Ser. No. 13/833,685 filed Mar. 15, 2013, entitled METHOD TO CREATE VACUUM INSULATED CABINETS FOR REFRIGERATORS, all of which are incorporated herein by reference in their entirety.

BACKGROUND OF THE INVENTION

Various types of insulated cabinet structures for refrigerators, freezers, and the like have been developed. Known refrigerator cabinets may include inner and outer side walls with a layer of insulating material such as polyurethane foam disposed between the inner and outer side walls. The foam provides insulation for the cabinet structure. However, known cabinet constructions may suffer from various drawbacks.

SUMMARY OF THE INVENTION

One aspect of the present invention is a method of fabricating a refrigerator having a vacuum insulated cabinet. The method includes forming an outer cabinet skin blank, the blank including an elongated portion having a generally rectangular perimeter with elongated side edges and end edges extending between the side edges. The blank defines a plurality of fold lines extending between the side edges to define a plurality of generally planar panel regions. The outer cabinet skin blank comprises a sheet of material that includes a metal layer and an outer layer of polymer material on a first side of a sheet. The polymer material is preferably a heat sealable thermoplastic polymer material. The method further includes providing a plurality of pouches having porous filler material disposed in the pouches. The pouches are positioned on the first side of the outer cabinet skin blank to cover the panel regions. The method includes providing a barrier layer that forms a barrier with respect to gasses and water vapor sufficient to maintain a vacuum. The barrier layer may comprise EVOH, metal foil, or other suitable material that is laminated with a layer of thermoplastic polymer material. The barrier layer may be sealed to the layer of polymer material around the pouches utilizing a heat seal process, mechanical pressure, adhesives, or other suitable technique. The pouches are thereby sealed inside an air-tight space formed between the layer of heat sealable polymer material and the barrier layer. The method also includes forming a vacuum in the air-tight space, and folding the cabinet skin blank along the fold lines to form a vacuum insulated cabinet structure having upright outer side walls and a transverse wall extending between the outer side walls. The vacuum insulated cabinet structure may include a floor structure having a front portion and a raised rear portion that is elevated relative to the front portion to define an exterior component-mounting space that is separated from the insulated interior space. One or more components of an electrically-powered refrigeration system may be mounted in the component-mounting space.

These and other features, advantages, and objects of the present invention will be further understood and appreciated by those skilled in the art by reference to the following specification, claims, and appended drawings.

BRIEF DESCRIPTION OF THE DRAWINGS

FIG. 4 is a plan view of an outer cabinet skin blank;

FIG. 5 is an isometric view of the cabinet skin blank of FIG. 4 showing the formation of a floor structure and a back panel;

FIG. 6 is a cross-sectional view of the outer cabinet skin blank of FIG. 4 taken along the line VI-VI;

FIG. 8 is an enlarged view of a portion of the refrigerator of FIG. 7;

FIG. 9 is an enlarged view of a portion of the refrigerator of FIG. 7;

FIG. 10 is an exploded isometric view of a vacuum insulated cabinet structure according to another aspect of the present invention;

FIG. 12 is a front elevational view of a refrigerator cabinet having a divider that includes a cooling module;

FIG. 13 is a cross-sectional view of the insulated cabinet structure of FIG. 12 taken along the line XIII-XIII;

FIG. 14 is a front elevational view of a refrigerator cabinet having a divider wall that includes a cooling module;

FIG. 15 is a cross-sectional view of the insulated cabinet structure of FIG. 14 taken along line XV-XV;

FIG. 16 is a front elevational view of a refrigerator cabinet having a divider that includes a cooling module;

FIG. 17 is a cross-sectional view of the insulated cabinet structure of FIG. 16 taken along line XVII-XVII;

FIG. 18 is a front elevational view of a refrigerator cabinet having a divider that includes a cooling module; and FIG. 19 is a cross-sectional view of the insulated cabinet structure of FIG. 18 taken along the line XIX-XIX.

DETAILED DESCRIPTION

Figure 1:
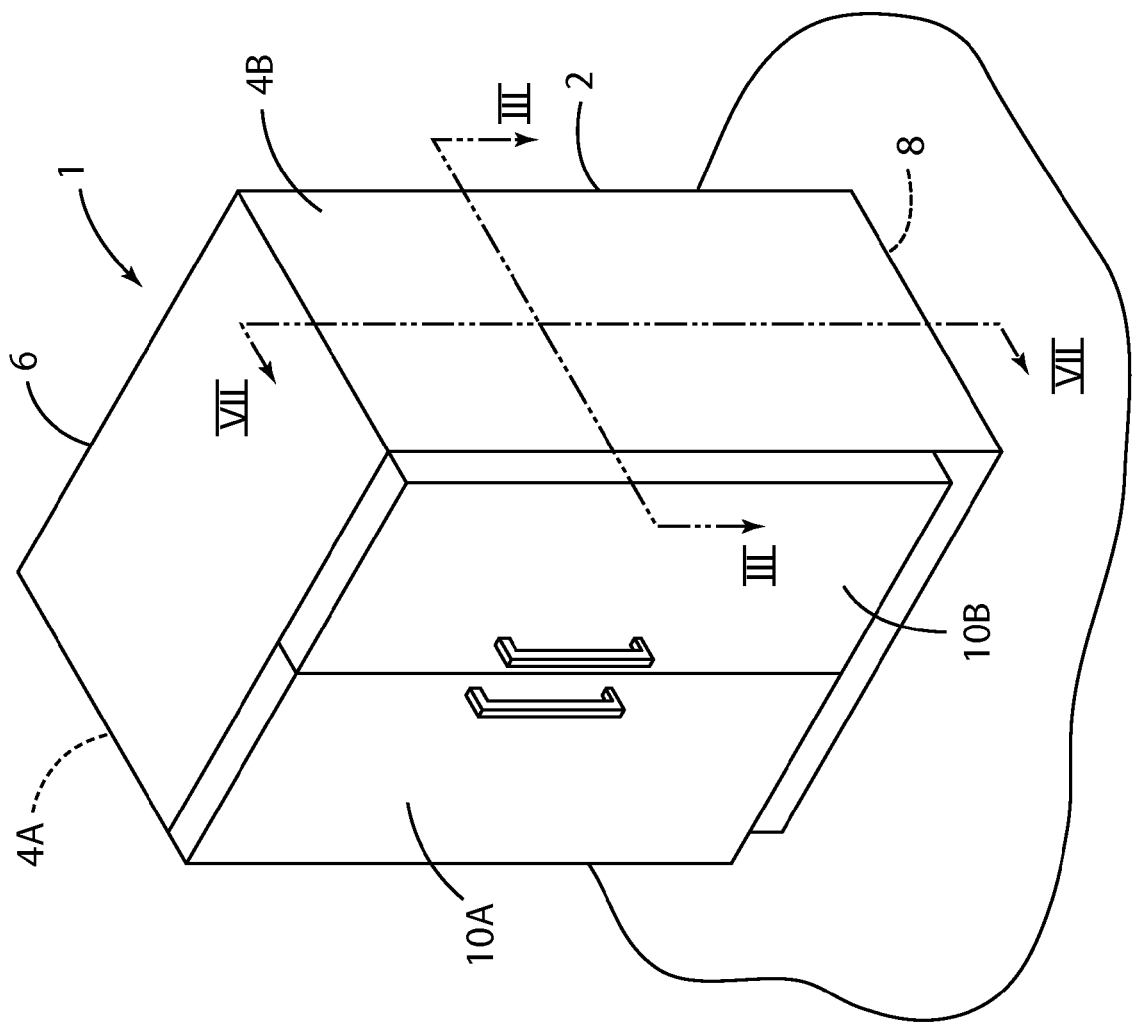
FIG. 1 is an isometric view of a refrigerator having a vacuum insulated cabinet structure according to one aspect of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

With reference to FIG. 1, a refrigerator 1 includes a vacuum insulated cabinet structure 2. The vacuum insulated cabinet structure 2 includes upright side walls 4A and 4B, an upper horizontal wall 6, and a generally horizontal lower wall 8 (see also FIG. 2). Doors 10A and 10B are moveably mounted to the cabinet structure 2 in a known manner.

Figure 2:
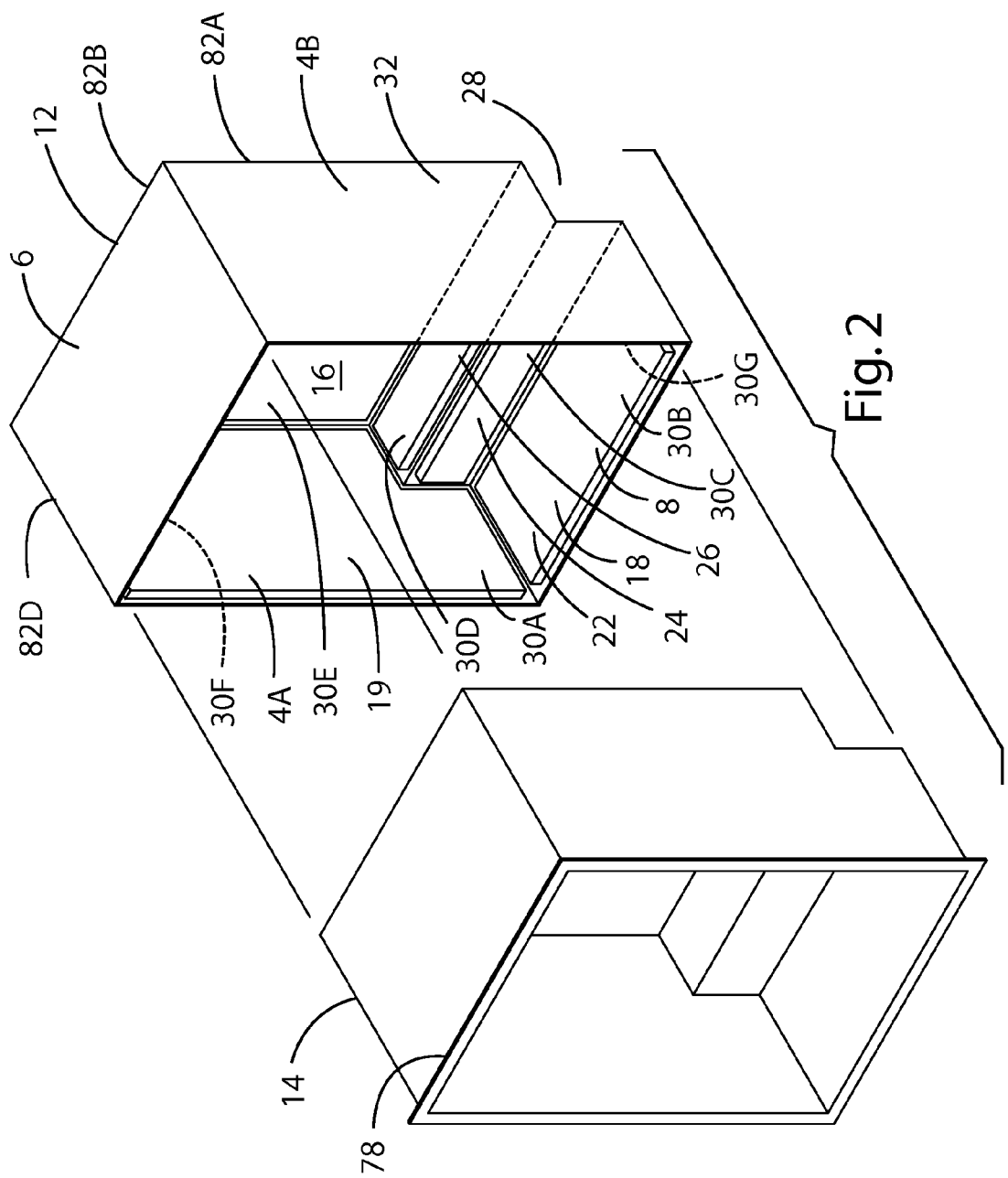
FIG. 2 is an exploded isometric view of a vacuum insulated cabinet structure and liner.

With further reference to FIG. 2, the vacuum insulated cabinet structure 2 may include a first cabinet structure or portion 12 and a liner 14. Liner 14 may be thermoformed from polymer material utilizing known materials and processes. As discussed in more detail below, the first portion 12 comprises sheet metal that is bent to form side walls 4A and 4B, upper horizontal wall 6, floor structure 18, and an optional rear wall 16. The first portion 12 defines an interior space 20 that receives liner 14. Insulating materials such as polyurethane foam may be injected between liner 14 and first portion 12.

As also discussed in more detail below, floor structure 18 includes a horizontal first portion 22, a vertical second portion 24, and a horizontal third portion 26. Third portion 26 is elevated relative to first portion 22 to define an exterior component mounting space 28 that may be utilized to mount a compressor and/or other cooling system components outside of insulated interior space 19 of vacuum insulated cabinet structure 2. The first portion 12 includes a plurality of vacuum insulated panels 30A-30G that are positioned on inner sides of metal outer layer 32 of first portion 12.

Figure 3:
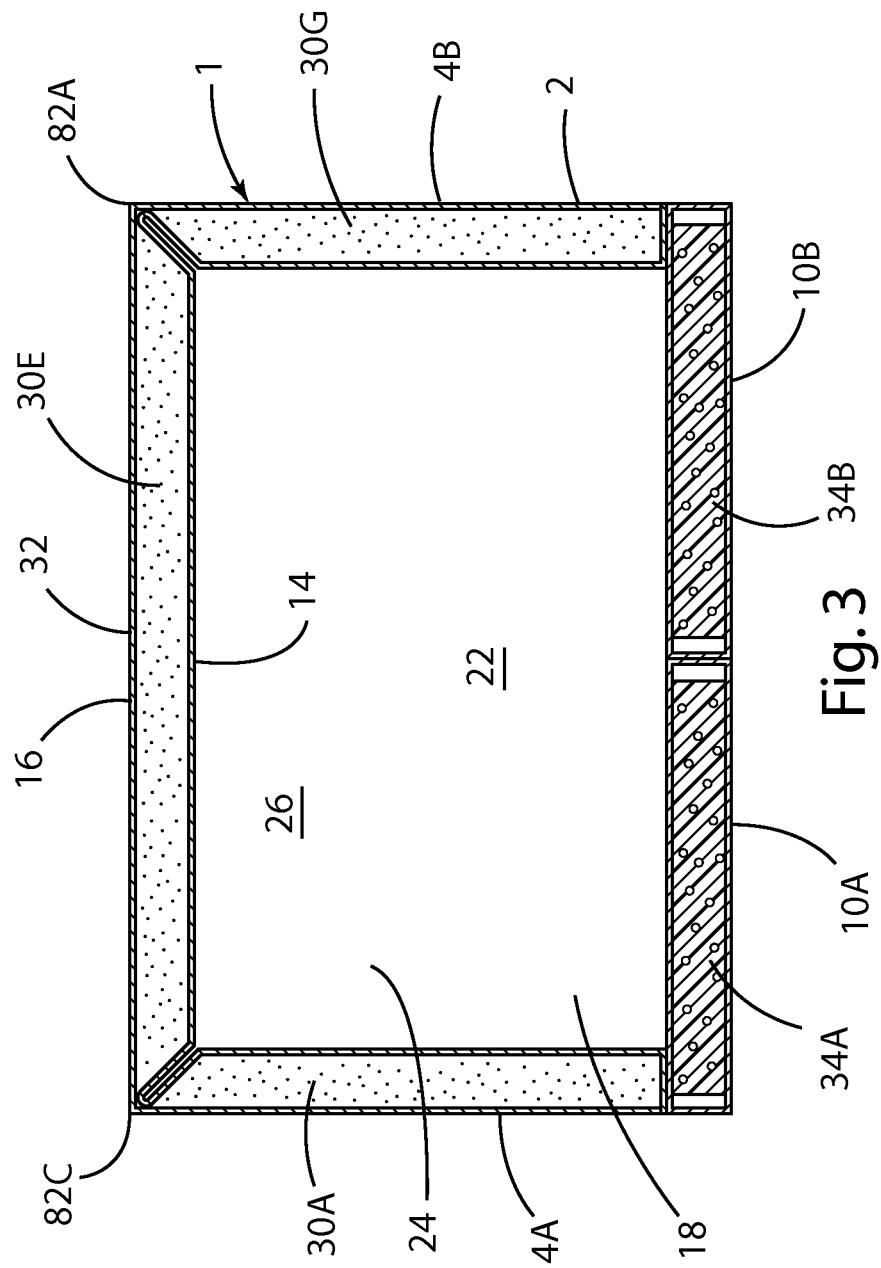
FIG. 3 is a cross-sectional view of the refrigerator of FIG. 1 taken along the line III-III.

With further reference to FIG. 3, the vacuum insulated panels 30A-30G are positioned between metal outer layer 32 of vacuum insulated cabinet structure 2 and the polymer inner liner 14. Doors 10A and 10B may be vacuum insulated in a manner that is substantially similar to the vacuum insulated cabinet structure 2, or the doors 10A and 10B may include a known insulation material such as foam insulation 34A and 34B.

With reference to FIG. 4, during fabrication of vacuum insulated cabinet structure 2, a layer of sheet metal is cut to form a blank 36 having an elongated rectangular portion 38 defining elongated opposite edges 40A and 40B, and end edges 42A and 42B. The blank 36 may optionally include a transversely-extending portion 44 that is utilized to form rear wall 16 of first portion 12 of vacuum insulated cabinet structure 2.

The blank 36 includes a plurality of panel regions 46A-46G. The blank 36 also defines a plurality of fold lines 48A-48C extending between opposite side edges 40A and 40B to define the boundaries of panel regions 46A-46D. A plurality of fold lines 48D-48F extend between panel regions 46E-46G. It will be understood that the fold lines 48A-48F do not necessarily comprise actual lines marked on blank 36, but rather represent lines where the blank 36 is to be folded. When the blank 36 is in a flat, unfolded condition (FIG. 4), a plurality of vacuum insulated panels 20A-20G are formed on panel regions 46A-46G (see also FIG. 5).

With further reference to FIG. 6, insulated panel 20D includes a polymer retaining structure 50. The polymer retaining structure 50 is preferably thermoformed from a sheet of material that includes one or more layers of a thermoplastic material such as high impact polystyrene that is laminated to a barrier layer. The barrier layer may comprise ethylene vinyl alcohol (EVOH) or other material (e.g. metal foil) that forms a barrier with respect to gasses and water vapor. The barrier layer preferably retains a vacuum in vacuum space 52 sufficient to prevent the thermal conductivity of the insulated panels from exceeding a value that is 200% of an initial value for at least 10 years. The retaining structure 50 includes a planar main wall 54 and transversely extending side walls 56A-56D (see also FIG. 4). The polymer retaining structure 50 includes a flange 60 extending around retaining structure 50 to define a perimeter 58. The perimeter 58 (flange 60) of retaining structure 50 is configured to follow the contours of panel region 46A. It will be understood that the size and shape of each polymer retaining structure 50 depends on the size and shape of the panel region 46A-46G for which the polymer retaining structure 50 is configured.

The blank 36 is formed from a sheet of material having a metal layer 62 comprising low carbon steel or other suitable metal, and a heat sealable polymer layer 64 laminated to the metal layer 62. The polymer retaining structure 50 can be connected to the blank 36 by sealing the flange 60 to polymer layer 64 to thereby form the air-tight interior vacuum space 52. Flange 60 can be sealed to polymer layer 64 utilizing a heat sealing process, mechanical pressure, adhesives, or other suitable process. Prior to sealing polymer retaining structure 50 to blank 36, a plurality of pouches 66 are positioned on the panel regions 46A-46G. Pouches 66 comprise an outer layer 68, and filler material 70 that is disposed inside the outer layer 68. The filler material 70 may comprise silica powder or other suitable filler material of a type used in vacuum insulated panels. The outer layer 68 may comprise paper or other material that permits air to escape from inside the pouch 66, while retaining the filler material 70 inside the pouch 66. In general, the pouches 66 include outer sides 72, inner sides 73 and peripheral edge 76. The pouches 66 are relatively thin, and the edges 76 of the pouches 66 preferably have a shape that conforms to the shape of panel regions 46A-46G.

During fabrication of vacuum insulated cabinet structure 2, the pouches 66 are positioned on panel regions 46A-46G, and polymer retaining structures 50 are positioned over the pouches 66. The entire blank 36 may then be positioned within a vacuum chamber (not shown), and the flanges 60 of the polymer retaining structures 50 are then sealed to the heat sealable polymer layer 64 of blank 36 to form interior vacuum spaces 52, with pouches 66 being disposed within the interior vacuum spaces 52. The blank 36 can then be removed from the vacuum chamber. Although the entire flange 60 of each polymer retaining structure 50 may be sealed to polymer layer 64 in a vacuum chamber, the polymer retaining structure 50 can also be sealed to the polymer layer 64 along only a portion of flange 60 prior to positioning the blank 36 in a vacuum chamber. After the blank 36 is positioned within a vacuum chamber, the previously unsealed portion of flange 60 can then be sealed to polymer layer 64 in a vacuum chamber.

With reference to FIG. 5, after the vacuum insulated panels 20A-20G are formed, the blank 36 is deformed along fold lines 48A-48F to thereby form the first portion 12 (see also FIG. 2) of the vacuum insulated cabinet structure 2. Referring again to FIG. 6, the side walls 56A-56D of polymer retaining structure 50 may be angled inwardly as shown in FIG. 6 at an angle of approximately 45 degrees, such that the side walls 56 of adjacent panel regions 46A-46G are closely fitted against one another after folding of blank 36. However, some of the side walls 56 may be substantially orthogonal to the blank 36 if required. For example, with reference to FIG. 4, the side wall 56C of vacuum insulated panel 20D may be orthogonal because the side wall 56C is not adjacent a fold line, but rather fits closely adjacent a flange 78 (FIG. 2) of liner 14 when assembled.

Referring again to FIG. 5, after the blank 36 is folded along the fold lines 48A-48F, the edges of the blank 36 can be interconnected by welding, deforming, or other suitable process to form corners 82A-82C (FIGS. 2 and 3). Referring again to FIG. 2, liner 14 can then be inserted into space 19 of first portion 12 of vacuum insulated cabinet structure 2. Polyurethane foam or the like may be injected between liner 14 and first cabinet structure 12 to fill gaps that may remain along the edges of vacuum insulated panels 20.

Figure 7:
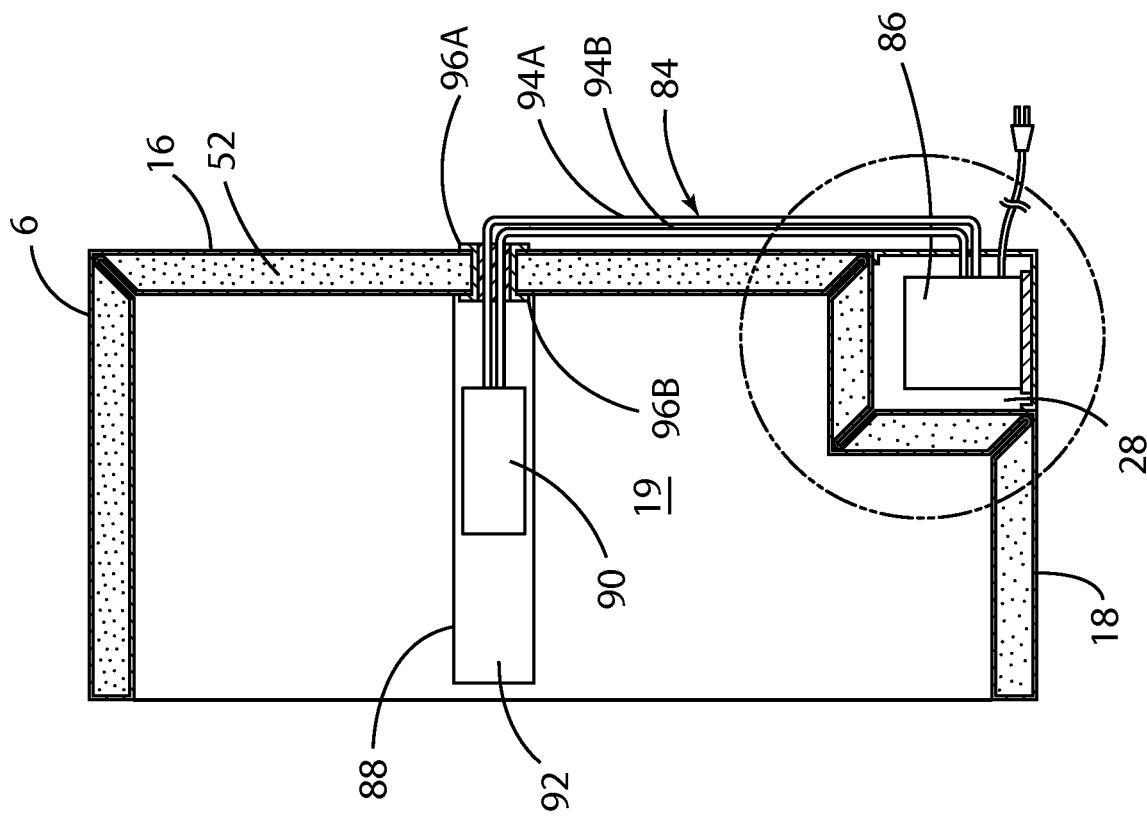
FIG. 7 is a cross-sectional view of the refrigerator of FIG. 1 taken along the line VII-VII.

With further reference to FIGS. 7-9, refrigerator 1 may include a cooling system 84. The cooling system 84 may include an electrically powered compressor 86 and/or other components mounted in exterior component mounting space 28. Refrigerator 1 may also include a divider 88 disposed within interior space 19. Divider 88 is configured to receive mechanical equipment for operating various functions of the refrigerator. As an example, a cooling module 90 may be disposed within interior volume 92 of divider 88 to cool the compartments on opposite sides of divider 88. Examples of various cooling module sets are disclosed in U.S. patent application Ser. No. 13/108,226 entitled "COOLING SYSTEM INTEGRATION ENABLING A PLATFORM ARCHITECTURE" filed on May 16, 2011; U.S. patent application Ser. No. 13/108,293 entitled "FLEXIBLE COOLING SYSTEM INTEGRATION FOR MULTIPLE PLATFORMS" filed on May 16, 2011; and U.S. patent application Ser. No. 13/108,183 entitled "UNIVERSAL AND FLEXIBLE COOLING MODULE SET (CMS) CONFIGURATION AND ARCHITECTURE" filed on May 16, 2011. Each of these patent applications is hereby incorporated by reference in their entirety. The cooling module 90 may be operably connected to compressor 86 and/or other components by utility lines 94A and 94B. The utility lines 94A and 94B pass through rear panel 16 at fittings 96A and 96B, respectively. The fittings 96A and 96B seal off the vacuum space 52 to ensure the space 52 maintains a vacuum. The utility lines 94A and 94B may comprise coolant lines, and cooling module 90 may comprise an evaporator and fan unit. Utility lines 94A and 94B may further comprise electrical lines to provide power for a fan of cooling module 90.

Referring to FIG. 8, utility lines 94A and 94B may also extend through third portion 26 of floor structure 18 at a fitting 96. If the utility lines 94A and 94B are routed into interior space 19 as shown in FIG. 8, the utility lines 94A and 94B may be routed directly adjacent inner surface 98 of first portion 12 of the cabinet structure 2, between liner 14 and one or more insulated panels 20A-20G. As discussed above, polyurethane foam or the like can be injected into the space between liner 14 and vacuum insulated panels 20A-20G. Accordingly, the utility lines 94A and 94B may be embedded in the polyurethane foam.

With further reference to FIG. 10, a vacuum insulated cabinet structure 102 according to another aspect of the present invention is constructed in a manner that is substantially similar to the vacuum insulated cabinet structure 2 described in more detail above. However, the insulated cabinet structure 102 includes a rear panel assembly 16A having a vertical panel portion 16B that may comprise a vacuum insulated panel, or it may comprise a conventional insulated panel having polyurethane foam disposed internally. Rear panel 16A may include a partition 88A that includes cooling modules (not shown) that are operably connected to a compressor (also not shown) that is disposed in an exterior space 28A. The vacuum insulated cabinet structure 102 may include a plurality of vacuum insulated panels 120 that are substantially similar to the vacuum insulated panels 20A-20G described in more detail above. The vacuum insulated cabinet structure 102 is fabricated in substantially the same manner as described in more detail above in connection with FIGS. 4-6. However, the blank 36 utilized to form vacuum insulated cabinet structure 102 does not include a panel region 46G (FIG. 4), such that an enlarged rear opening 100 is formed in vacuum insulated cabinet structure 102.

Figure 11:
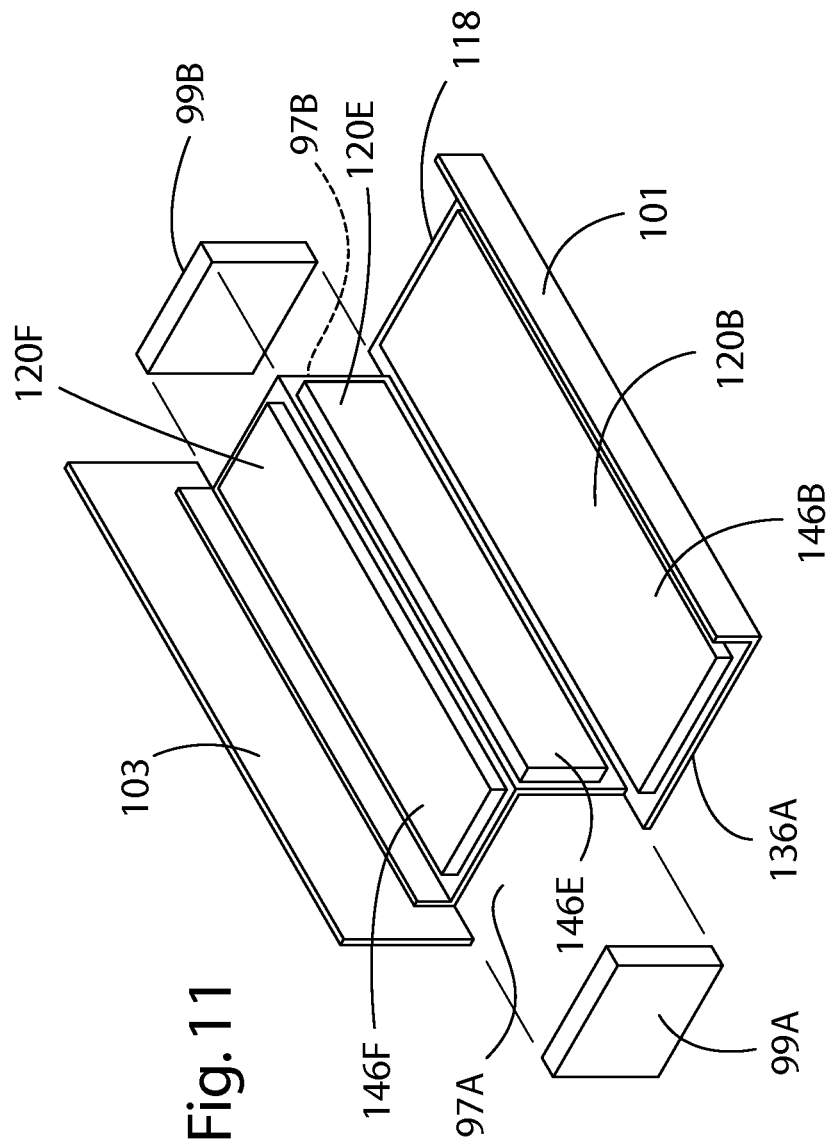
FIG. 11 is an exploded isometric view of a portion of the vacuum insulated structure of FIG. 10.

With further reference to FIG. 11, floor structure 118 may be formed from a separate blank 36A, and vacuum panels 120B, 120E and 120F may be formed at panel regions 146B, 146E and 146F. A front flange 101 may, when assembled, be connected to flange 78 of a liner 14 (FIG. 2), and an upright rear flange 103 may be connected to rear panel wall 16B. Panels 99A and 99B may be secured to the floor structure 118 to close off open ends 97A and 97B of exterior space 28A. The panels 99A and 99B may include one or more apertures (not shown) to provide for routing of utility lines from a compressor or other cooling system component disposed in exterior space 28A to a location within the interior space 119 of insulated cabinet structure 102. As discussed above, rear panel 16B may comprise a panel structure having inner and outer side walls with a polyurethane foam insulating material disposed in an interior space of the panel 16B. Utility lines from a compressor or other component disposed in exterior space 28A may be routed within panel 16B to an evaporator, fan, and/or other such components disposed within divider 88. A liner 14 (FIG. 2) may be inserted into interior space 119 (FIG. 10) of vacuum insulated cabinet structure 102.

FIGS. 12-19 show additional embodiments of refrigerators according to the present invention. FIGS. 12 and 13 show a refrigerator 201A, FIGS. 14 and 15 show a refrigerator 201B, FIGS. 16 and 17 show a refrigerator 201C, and FIGS. 18 and 19 show a refrigerator 201D. The insulated cabinet structures 202A-202D of refrigerators 201A-201D respectively, may comprise vacuum insulated cabinets constructed as described in more detail above in connection with FIGS. 1-11. Alternately, the insulated cabinet structures 202A-202D may include conventional insulation such as polyurethane foam or the like. The refrigerators 201A-201D include partitions 288A-288D that include cooling modules 290A-290D that provide independent cooling for compartments 210A-210D and 220A-220D formed on opposite sides of the partitions 288A-288D. For example, the compartments 210A-210D may comprise fresh food compartments that are maintained at a first temperature that is above freezing, and the compartments 220A-220D may comprise freezer compartments that are maintained at a temperature below freezing. Openings 205A-205D may be formed in the insulated cabinet structures 202A-202D to provide for venting of heated air produced by the cooling modules 290A-290D.

Refrigerators 201A-201D may include exterior spaces 228A-228D that are substantially similar to the space 28 described in more detail above in connection with FIGS. 1-9. A compressor (not shown) may be mounted in the spaces 228A-228D of refrigerators 201A-201D, and coolant lines (not shown) may be routed to the cooling modules 290A-290D through the insulated cabinet structure 202 as described in more detail above in connection with FIGS. 1-11. Alternately, the cooling modules 290A-290D may include a compressor, such that the compressor is not mounted in the external spaces 228A-228D. Alternately, cooling module 290A may comprise a thermoelectric cooling unit that does not include a compressor, such that substantially all of the components can be mounted within the modules 290A-290D.

With reference to FIGS. 12 and 13, refrigerator 201A includes an upper fresh food compartment 210A, and a lower freezer compartment 220A. With reference to FIGS. 14 and 15, refrigerator 201B includes a fresh food compartment 210B and a freezer compartment 220B that are disposed in a side-by-side configuration. With reference to FIGS. 16 and 17, refrigerator 201C includes an upper freezer compartment 220C and a lower fresh food compartment 210C. With reference to FIGS. 18 and 19, refrigerator 201D includes a fresh food compartment 210D and a freezer compartment 220D. Refrigerator 201D also includes a third compartment 225D. The third compartment 225D may be maintained at a third temperature that is not equal to the temperatures of compartments 210D and 220D. Third compartment 225D may be operably connected to compartments 210D and/or 220D by powered "air doors" (not shown) in partitions 288D and 214D. The air doors may be configured to open as required to permit airflow between third compartment 225D and compartments 210D and/or 220D to thereby control the temperature of third compartment 225D. The temperature of third compartment 225D may also be independently controlled utilizing other known arrangements.

The invention claimed is:

1. A method of fabricating a vacuum insulated refrigerator cabinet structure, the method comprising:
   forming an outer cabinet skin blank, the blank including an elongated portion having a generally rectangular perimeter with elongated side edges and end edges extending between the side edges, the blank defining a plurality of bend lines extending between the side edges to define a plurality of generally planar panel regions, and wherein the outer cabinet skin blank comprises a sheet of material that includes a metal layer and an outer layer of thermoplastic polymer material on a first side of the sheet;
   providing a plurality of pouches having porous filler material disposed in the pouches;
   positioning the pouches on the first side of the outer cabinet skin blank to cover the panel regions;
   providing a barrier layer;
   sealing the barrier layer to the layer of polymer material around the pouches such that the pouches are sealed inside an airtight space formed between the layer of polymer material and the barrier layer;
   forming a vacuum in the airtight space;
   bending the cabinet skin blank along the bend lines to form a vacuum insulated refrigerator cabinet structure having upright outer sidewalls having inner and outer sides and a transverse wall having inner and outer sides, the transverse wall extending between the outer sidewalls, and wherein the metal layer is disposed on the outer sides of the outer side walls and the outer side of the transverse wall.

2. The method of claim 1, wherein:
   the outer side walls define generally horizontal upper edges, and the transverse wall comprises a generally planar upper wall having opposite side edges connected to the horizontal upper edges of the outer side walls.

3. The method of claim 2, including:
   forming the barrier layer to define a preformed retaining structure prior to sealing the barrier layer to the layer of polymer material of the blank, the preformed retaining structure having a shallow cavity having an opening, the preformed retaining structure defining a perimeter extending around the opening;
   wherein the perimeter is sealed to the layer of polymer material.

4. The method of claim 3, wherein:
   the preformed retaining structure is preformed to include a generally planar side wall having a generally rectangular perimeter, the preformed retaining structure further including edge walls extending transversely from the rectangular perimeter to define the shallow cavity, the preformed retaining structure further including an outwardly extending flange at the perimeter of the opening, the outwardly extending flange at the perimeter of the opening, the outwardly extending flange forming a generally planar annular surface extending around the opening;
   and wherein the generally planar annular surface of the preformed retaining structure is brought into contact with the polymer material and heat sealed to the polymer material to form a seal line that extends around the porous filler material.

5. The method of claim 4, wherein:
   the barrier layer is laminated to a layer of thermoplastic polymer material;
   forming the barrier layer includes thermoforming the layer of thermoplastic polymer material prior to sealing the barrier layer to the layer of polymer material of the blank.

6. The method of claim 2, including:
   forming a cabinet floor structure extending between lower portions of the outer side walls, the floor structure including a front portion and a raised rear portion that is elevated relative to the front portion to define an exterior component-mounting space that is separated from the insulated interior space;
   providing an electrically-powered refrigeration system having a plurality of components;
   mounting at least a first one of the components to the cabinet in the component-mounting space.

7. The method of claim 6, wherein:
   the outer side walls have vertically extending rear edges;
   the upper wall includes a horizontally extending rear edge;
   the floor structure defines a rear edge;
   the rear edges of the outer side wall, the upper wall, and the floor structure define an enlarged rear opening;
   forming an insulated rear cabinet wall structure;
   closing off the enlarged rear opening with the rear cabinet wall structure.

8. The method of claim 7, wherein:
   the vacuum insulated refrigerator cabinet structure forms an insulated interior space;
   providing a partition, the partition including a cooling module;
   connecting the partition to the rear cabinet wall structure;
   positioning the partition in the insulated interior space to define first and second insulated compartments on opposite sides of the partition such that the cooling module provides cooling for at least one of the first and second insulated compartments;
   routing utility lines to operably interconnect the cooling module with the first component mounted in the component-mounting space.

9. The method of claim 8, wherein:
   forming the outer cabinet skin blank includes forming a central portion defining first, second, and third rectangular floor panel regions disposed side-by-side, and first and second rectangular side panel regions disposed on opposite sides of the rectangular floor panel regions, and a rectangular upper panel region disposed adjacent the first rectangular side panel region; and including:
   cutting the outer cabinet skin blank along opposite side edges of the first panel region;

bending the outer cabinet skin blank between the first and second floor panel regions such that the second floor panel region extends upwardly transverse to the first floor panel region;

bending the outer cabinet skin blank between the second and third floor panel regions such that the third floor panel region extends horizontally rearwardly from the second floor panel region and forms the raised rear portion of the cabinet floor structure;

bending the outer cabinet skin blank along fold lines on opposite sides of the central portion of the outer cabinet skin blank such that the side panel regions extend vertically relative to the first floor panel region;

bending the outer cabinet skin blank between the first rectangular side panel region and the upper panel region to form a horizontal upper side wall extending between the side panel regions.

10. A method of fabricating a vacuum insulated refrigerator cabinet structure, the method comprising:

forming an outer cabinet skin blank, the blank including an elongated portion having a generally rectangular perimeter with elongated side edges and end edges extending between the side edges, the blank defining a plurality of bend lines extending between the side edges to define a plurality of generally planar panel regions, and wherein the outer cabinet skin blank comprises a sheet of material that includes a layer of low carbon steel and a heat sealable polymer layer laminated to the layer of low carbon steel on a first side of the sheet;

providing a plurality of vacuum insulated panels comprising porous filler material;

positioning the vacuum insulated panels on the side of the outer cabinet skin blank to cover the panel regions;

providing a plurality of preformed retaining structures having a main wall, a flange defining a perimeter, and side walls extending transversely between the main wall and the flange, wherein the retaining structures comprise a layer of thermoplastic polymer material and a barrier layer that forms a barrier with respect to gasses;

sealing the flanges of the preformed retaining structures to the layer of polymer material around the vacuum insulated panels such that the vacuum insulated panels are sealed inside an airtight space formed between the blank and the preformed retaining structures;

forming a vacuum in the airtight space;

bending the cabinet skin blank along the bend lines to form a vacuum insulated refrigerator cabinet structure having upright outer sidewalls and a transverse wall extending between the outer sidewalk.

11. The method of claim 10, wherein:

the vacuum insulated panels comprise pouches.

* * * * *